Nov. 30, 1948.  E. BYLUND  2,454,909
BRUSH MOUNTING FOR ELECTRIC MOTORS
Filed July 27, 1946  2 Sheets-Sheet 1
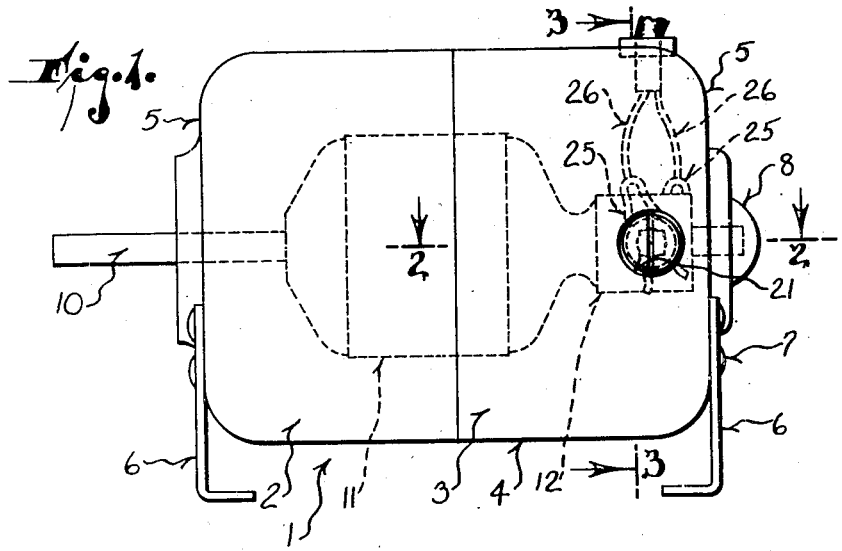
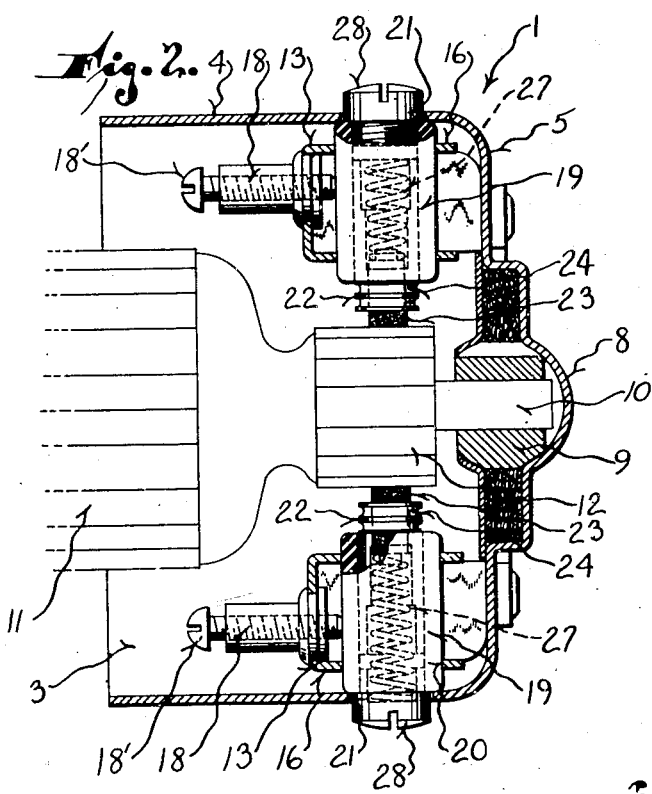
Inventor
Eric Bylund
By his Attorney Nov. 30, 1948.   E. BYLUND   2,454,909
BRUSH MOUNTING FOR ELECTRIC MOTORS
Filed July 27, 1946   2 Sheets-Sheet 2
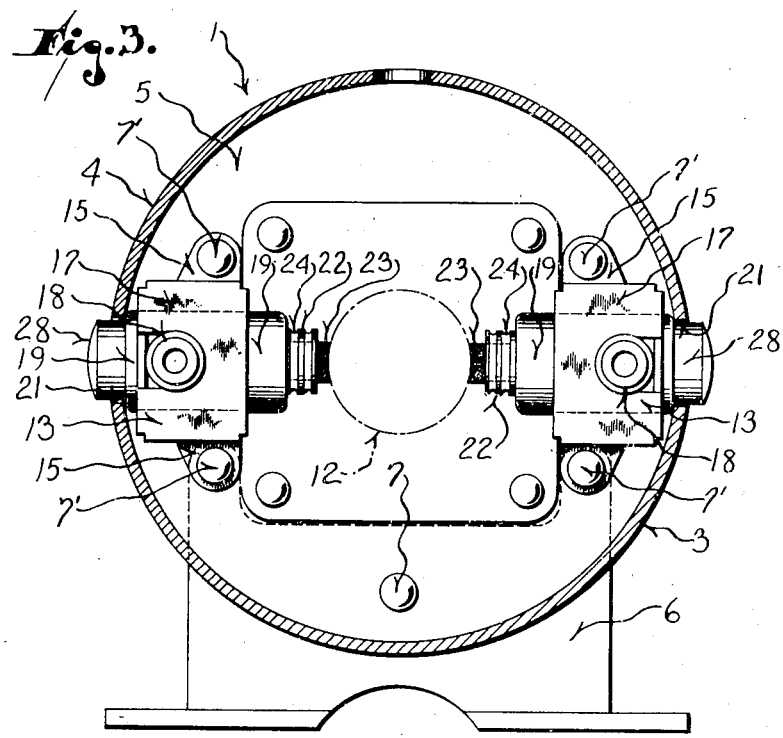
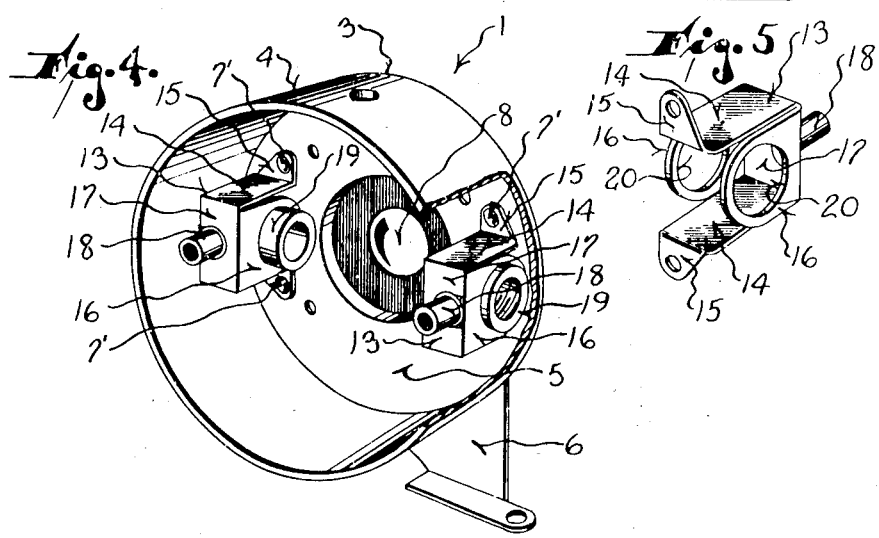
Inventor
Eric Bylund Patented Nov. 30, 1948

2,454,909

UNITED STATES PATENT OFFICE 2,454,909

BRUSH MOUNTING FOR ELECTRIC MOTORS

Eric Bylund, Genoa, Ill., assignor to John Oster Manufacturing Company, Racine, Wis., a corporation of Wisconsin Application July 27, 1946, Serial No. 686,612

3 Claims. (Cl. 171—323)

1

This invention relates to electric motors, and more particularly to a brush mounting for electric motors of the fractional horsepower type.

It is an object of this invention to provide a novel brush mounting for small electric motors which will be simple and inexpensive to manufacture.

Another object of this invention resides in the provision of a brush mounting fixture for fractional horsepower electric motors which may be stamped from a single piece of sheet metal and which is particularly suitable for use in motors having a stamped sheet metal housing.

A further object of this invention resides in the provision of a brush mounting for fractional horsepower motors which will enable inexperienced personnel to install brush assemblies rapidly and accurately, and which will securely retain the brushes in their proper location under the vibration normally attendant upon the operation of electrical appliances.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a side view of an electric motor of the type to which the brush mounting of this invention is particularly adaptable.

Figure 2 is a longitudinal sectional view taken along the line 2—2 in Figure 1, showing the brush assemblies partly in elevation.

Figure 3 is a cross-sectional view of the motor taken along the line 3—3 in Figure 1;

Figure 4 is a perspective view, partially broken away, showing a portion of the motor casing with brush mountings installed therein; and Figure 5 is a perspective view of the brush mounting fixture of this invention shown detached from the motor housing.

Referring now to the accompanying drawings, in which like numerals designate like parts throughout the several views, the numeral 1 designates generally the housing of an electric motor, formed from two similar cup shaped stampings 2 and 3, each having substantially cylindrical side

2 walls 4 and a substantially flat end wall 5, joined together in any desired manner (as, for example, by tie bolts, not shown) to form the shell-like housing 1. Although the brush holder of the invention is suitable for use in a motor having a cast housing, it is especially adapted for installation in motors of the type having such stamped metal housings as herein shown, and the following discussion will therefore deal more particularly with a motor having such a housing.

Suitable mounting flanges 6 may be secured to the outside of the end walls 5 of the housing 1 by means of rivets 7. Sockets 8 may also be provided in the end wall 5 of the housing to accommodate bearings 9 of any desired type, in which is journalled the shaft 10 of an armature 11. A commutator 12 is secured to the shaft 10 and rotates with the armature.

Brush mounting fixtures 13 are secured in the shell or housing section 3. These fixtures are preferably fabricated as sheet metal stampings and, as shown in Figure 5, comprise a substantially U-shaped main section having legs 14 which terminate in mounting flanges 15, a pair of apertured walls 16 struck in from the closed end 17 of the U-shaped main section, and a ferrule 18 secured to the closed end 17 and tapped to receive a set screw 18'. The brush mounting fixtures 13 may be secured to the end wall 5 of the housing section 3 by certain of the rivets 7' which secure the adjacent mounting flange 6 to the housing.

Insulating brush holder tubes 19, of fibre or plastic, are received in the apertures 20 in the walls 16 of the brush mounting fixture 13, and are secured in place by means of the set screws 18'.

The mounting fixtures 13 are so located as to align the axes of the brush holder tubes 19 with the centers of brush access holes 21 in the side wall 4 of the housing shell 3 and with the commutator 12. The brush access holes 21 are smaller in diameter than the brush holder tubes 19 so that when the brush holder tubes are inserted into the mounting fixtures 13 from inside the housing they will bottom on the portion of the housing wall around the brush access holes 21 to be automatically located in proper alignment with the commutator 12 and properly spaced therefrom.

Metal sleeves 22 are pressed or otherwise secured in the brush holder tubes 19, and brushes 23 are received in these sleeves. An annular groove 24 on each sleeve accommodates a terminal clip 25 secured to a wire lead 26 to supply current to each of the brushes. Brush springs 27 in the sleeves 22 urge the brushes into engagement with the commutator 12 and react against threaded plugs 28 in the outer ends of the brush holder tubes 19.

In assembling the brush holders of this invention, the brush mounting fixtures 13 are first riveted to the end wall 5 of the housing stamping 3. The brush holder tubes 19, with the metal sleeves 22 in place, are then inserted into the mounting fixtures from inside the housing and are moved outwardly until their outer ends abut the side wall 4 of the housing as described above. The set screws 18' are then turned down into secure engagement with the brush holder tubes 19. The clips 25 are snapped in place on the annular groove 24 on the sleeves 22, and the armature shaft 10 is inserted into the bearings 9, after which the two shells 2 and 3 are assembled.

The brushes 23 may then be slipped into the brush holder tubes 19, the brush springs 27 inserted, and the plugs 28 screwed into place in the outer ends of the brush holder tubes through the brush access holes 21.

It is to be noted that tightening the set screw 18' tends to bow the closed end 17 of the brush mounting fixture 13 and places the entire fixture in tension, due to the flexibility of the sheet metal of which the stamping is fabricated. Hence, vibration will not loosen the set screw as easily as it would in the absence of this tension on the screw. Moreover, the reaction of the brush spring 27 against the brush 23 and the plug 28 constantly urges the outer end of the brush holder tube 19 against the side wall 4 of the housing shell 3, thus preventing the brush holder tubes 19 from being moved out of their correct positions even though the set screws might loosen.

From the foregoing description, taken together with the accompanying drawings, it will be readily apparent that this invention provides a novel and inexpensive brush mounting, particularly adapted to fractional horsepower motors of the type having a stamped metal housing, which may be assembled quickly by inexperienced personnel and which will accurately retain the brushes in their proper location with respect to the armature.

What I claim as my invention is:

1. In an electric motor: a housing having a side wall and an end wall; an armature rotatable in said housing and having a commutator adjacent to said end wall thereof; a brush supporting fixture fixed to said housing adjacent to said end wall thereof, said fixture including spaced apart substantially parallel side walls interposed between the commutator and the side wall of the housing and lying in planes normal to a radius of the commutator, said walls of the fixture having apertures arranged on a common axis normal to the axis of the commutator; an insulating brush holding tube loosely received in said apertures so as to be supported from said fixture walls a predetermined distance from said end wall of the housing and with its axis normal to the axis of the commutator; a brush carried by said tube for engagement with the commutator; and means on said fixture accessible only from the inside of the housing for detachably holding said tube against axial shifting relative to the fixture.

2. In an electric motor: a housing having a side wall and an end wall; an armature rotatable in said housing and having a commutator adjacent to said end wall; a brush supporting fixture secured to said end wall of the housing adjacent to the commutator, said fixture comprising a U-shaped stamping having flanges on the extremities of its legs overlying said end wall and providing for securement of the fixture thereto, and spaced parallel side walls at opposite sides of the legs of the U-shaped stamping, said side walls being interposed between the commutator and the side wall of the housing and lying in planes normal to the radius of the commutator, with apertures in said side walls arranged on a common axis normal to the axis of the commutator; an insulating brush holding tube loosely received in said apertures so as to be supported from the side walls of the fixture a predetermined distance from said end wall of the housing and with its axis normal to the axis of the commutator; a brush carried by said brush holding tube for engagement with the commutator; and a set screw carried by the closed end of the U-shaped stamping for engagement with the exterior of said brush holding tube supported thereby for holding the tube against axial shifting relative to the fixture.

3. The electric motor set forth in claim 2 wherein said brush holding tube is adapted to have its end remote from the commutator engaged with the inner surface of the housing side wall in line with an access hole therein; and wherein the brush is yieldingly urged toward and into engagement with the commutator by means of a compression spring inside the brush holding tube confined between the brush and a plug passing freely through said access hole in the side wall of the housing and threaded into the tube.

ERIC BYLUND.

REFERENCES CITED

The following references are of record in the file of this patent:

UNITED STATES PATENTS

| Number | Name | Date |
|---|---|---|
| 961,902 | Seeley | June 21, 1910 |
| 1,073,874 | Smith | Sept. 23, 1913 |
| 1,263,323 | Kaempf | Apr. 16, 1918 |
| 2,194,211 | Samsom | Mar. 19, 1940 |